United States Patent
Fink et al.

(10) Patent No.: US 8,138,750 B2
(45) Date of Patent: Mar. 20, 2012

(54) INTEGRATED ELECTRONIC CIRCUIT

(75) Inventors: Hans-Jörg Fink, Freiburg (DE); Martin Bayer, Vörstetten (DE); Reiner Bidenbach, Vörstetten (DE); Yoshiyuki Kono, Kariya (JP)

(73) Assignees: Micronas GmbH, Freiburg I. BR. (DE); Denso Corporation, Kariya-shi, Aichi-ken (JP)

( * ) Notice: Subject to any disclaimer, the term of this patent is extended or adjusted under 35 U.S.C. 154(b) by 805 days.

(21) Appl. No.: 12/093,262

(22) PCT Filed: Nov. 10, 2006

(86) PCT No.: PCT/EP2006/010811
§ 371 (c)(1),
(2), (4) Date: Sep. 11, 2008

(87) PCT Pub. No.: WO2007/054344
PCT Pub. Date: May 18, 2007

(65) Prior Publication Data
US 2009/0079420 A1    Mar. 26, 2009

(30) Foreign Application Priority Data

Nov. 11, 2005 (DE) .......................... 10 2005 054 257
Jan. 16, 2006 (DE) .......................... 10 2006 002 221

(51) Int. Cl.
*G01R 33/07* (2006.01)
*G01B 7/14* (2006.01)
(52) U.S. Cl. ..................................... 324/207.2; 324/251
(58) Field of Classification Search ............... 324/207.2, 324/251
See application file for complete search history.

(56) References Cited

U.S. PATENT DOCUMENTS

| | | | |
|---|---|---|---|
| 5,646,523 A | 7/1997 | Kaiser et al. | 324/207.2 |
| 5,714,882 A | 2/1998 | Mehnert et al. | 324/207.15 |
| 6,281,653 B1 | 8/2001 | Heib et al. | 318/600 |
| 7,170,787 B2 * | 1/2007 | Sakurai et al. | 365/185.18 |
| 7,391,207 B2 * | 6/2008 | Oohira | 324/207.25 |
| 2006/0023503 A1 * | 2/2006 | Lee | 365/185.05 |

FOREIGN PATENT DOCUMENTS

| | | |
|---|---|---|
| DE | 10130183 | 1/2003 |
| EP | 0479525 | 4/1992 |

* cited by examiner

*Primary Examiner* — Bot Ledynh
(74) *Attorney, Agent, or Firm* — Muncy, Geissler, Olds & Lowe, PLLC

(57) ABSTRACT

Disclosed is an integrated electronic circuit comprising a core circuit that generates a useful signal as well as a buffer for storing the useful signal. The buffer stores the last read value of the useful signal for a predetermined period of time when the power supply is interrupted, and the buffer is disconnected from the power supply of the other circuits.

5 Claims, 1 Drawing Sheet

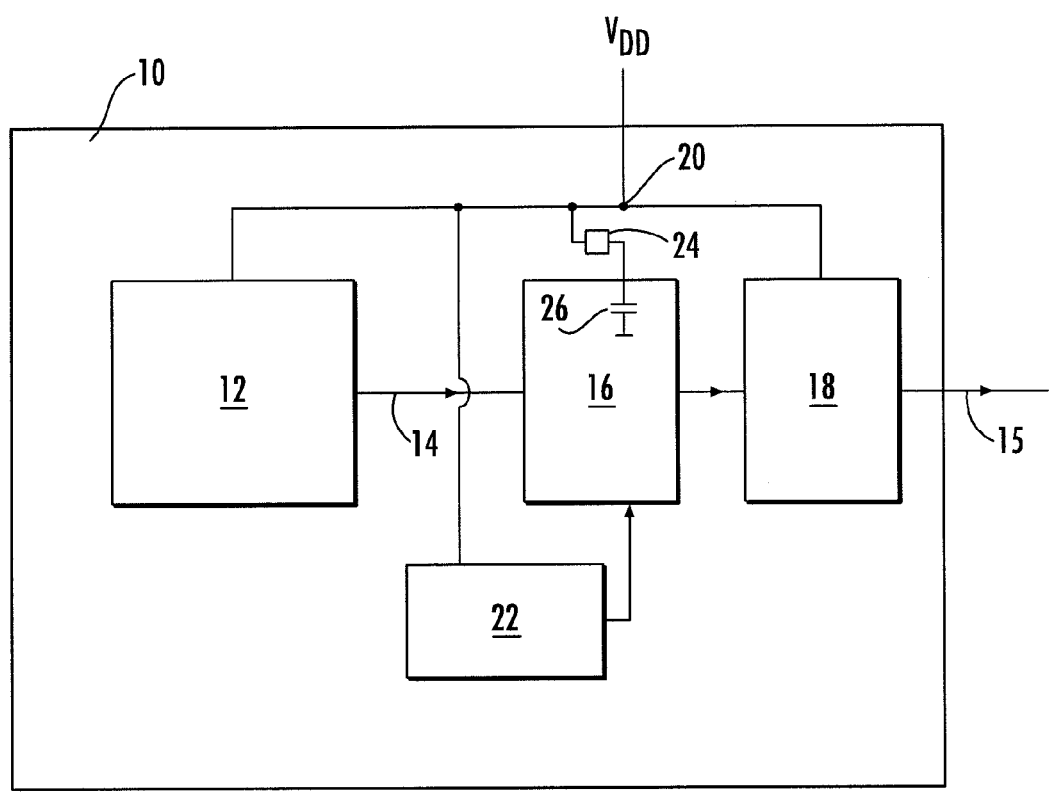

INTEGRATED ELECTRONIC CIRCUIT

PRIORITY INFORMATION

This patent application claims priority from PCT Application No. PCT/EP2006/010811 filed Nov. 10, 2006, German Application No. 10 2005 054 257.3 filed Nov. 11, 2005 and German Application No. 10 2006 022 221.1 filed Jan. 16, 2006, which are hereby incorporated by reference.

BACKGROUND OF THE INVENTION

The invention relates to an integrated electronic circuit, and in particular to an integrated circuit comprising a core circuit generating a measured signal.

A measured signal generated by a core circuit may be further processed in other circuits within an integrated circuit or it may be output. A disturbance in the power supply, e.g. a voltage breakdown, an interruption or an overvoltage may have an undesired effect on the measured signal. Thus the further processing or the output of the signal is impaired. It is an aim of the invention to ensure the processability of the measured signal.

SUMMARY OF THE INVENTION

The invention provides an integrated electronic circuit, wherein the effects on the measured signal from a disturbance in the power supply to the integrated circuit are minimized. During normal operation, i.e. without any disturbance in the power supply, the measured signal can continuously be stored in an intermediate memory and can be provided from there to the other circuits within the integrated circuit. If a disturbance occurs, which has an effect in particular to the measured signal, then, rather than using the disturbed measured signal, the latest value of the measured signal stored in the intermediate memory may be used as a fallback. Due to the decoupling from the power supply of the other circuits, the intermediate memory is not affected by the disturbance and is capable to preserve the value which was written-in before the disturbance, during the period of disturbance. Without this decoupling, an arbitrary value would manifest in the intermediate memory, which may lead to unpredictable results during further processing of the measured signal. The provision of the latest read-in value of the measured signal in the intermediate memory ensures a measured signal with minimal leaps, thus facilitating further processing in other circuits of the integrated circuit or in external circuits which are provided with the measured signal.

According to an advantageous embodiment of the invention, the intermediate memory stores the latest read-in value at least until it is ensured that valid values are again read-in to the intermediate memory. Depending on its design, the core circuit may not be able to output valid values directly after a disturbance of the power supply. For example, if the core circuit undergoes a reset procedure after the disturbance. In this case, it may take some time until the core circuit will again provide a reasonable measured signal. During this time, the core circuit outputs for example a signal whose value may be close to zero voltage or close to the supply voltage. By means of the invention, this period is bridged by the intermediate memory providing the latest read-in value of the measured signal.

According to an advantageous embodiment of the invention, it is provided that the integrated electronic circuit forms an active sensor, in which the core circuit is a measuring circuit, generating a measuring signal as measured signal. Such a sensor provides a high reliability, because the effects of disturbances in the power supply are minimized. In particular, such a sensor may provide a defined output signal immediately after disturbances in the power supply. The high reliability is of particular importance with the use of sensors in automotive, where sensors may be exposed to numerous disturbances, e.g. by the ignition.

According to another advantageous embodiment of the invention, it is provided that the sensor is a distance or an angular sensor. The active distance or angular sensor according to aspects of the invention may replace electro-mechanical distance or an angular sensors, e.g. potentiometers, and offers the advantage of a longer lifetime, higher reliability and lesser sensibility to soiling, without having to trade in these advantages with a, with regard to electro-mechanical sensors, higher sensibility to disturbances in power supply.

These and other objects, features and advantages of the present invention will become more apparent in light of the following detailed description of preferred embodiments thereof, as illustrated in the accompanying drawings.

BRIEF DESCRIPTION OF THE DRAWING

The sole FIGURE is a block diagram illustration of an integrated circuit.

DETAILED DESCRIPTION OF THE INVENTION

The embodiment comprises an integrated circuit 10, forming an active distance or angular sensor, with a measurement circuit 12, an intermediate memory 16 and an output circuit 18. The integrated circuit 10 further comprises a power supply 20 and a control unit 22. The integrated circuit may also comprise further units which are not relevant for comprehending the invention.

The measuring circuit 12 generates a measuring signal on a line 14, which corresponds to a measured distance or angle. The measuring signal on the line 14 is stored in the intermediate memory 16 and is available for the output circuit 18. The latter may read-out the measuring signal, process it further if applicable, and provide an output signal on a line 15 in response to the measuring signal.

The power supply 20 provides the needed energy for the measuring circuit 12, the control circuit 22 and the output circuit 18. The intermediate memory 16 is connected to the power supply 20 via a decoupling device 24 and is buffered by an integrated storage element 26, thus, the intermediate memory 16 is decoupled from disturbances in the power supply. By the integrated storage element 26, advantageously external components such as capacitors for buffering are rendered obsolete. Decoupling may in particular be designed to avoid impairment of the intermediate memory upon a reversal of the supply voltage caused by disturbance, i.e. when a momentary negative supply voltage Vdd occurs.

The control circuit 22 monitors the power supply and controls the intermediate memory 16. As long as the power supply is ok, i.e. the supply voltage $V_{dd}$ is within a range where the connected circuits work properly, especially the measuring circuit 12 provides a reasonable measuring signal, the control unit 22 controls the intermediate memory in such a way that it reads-in the measuring signal an provides it to the output circuit.

A disturbance in the power supply, e.g. by a break-in of the supply voltage, causes the intermediate memory to cease reading-in the measuring signal. In the simplest case, this is induced by failure of the control unit 22 which results in missing control for the intermediate memory. Since the intermediate memory 16 has its own power supply, it is not affected by the disturbance, and therefore no senseless, e.g. arbitrary values may reach the intermediate memory, but the latest read-in value is conserved.

The control unit 22 provides for that, after the disturbance, when the power supply is restored, the value that has been stored in the intermediate memory 16 before the disturbance, is available for a determined period, so the output circuit 18 may be able to provide an output signal with a defined value even immediately after the disturbance. If the disturbance has a short duration with regard to the variation velocity of the measuring signal, then the output signal can append without great error to the signal form before the disturbance. Thus, the output signal experiences only an indispensable error caused by the disturbance in the power supply. A longer-term deviation in the measuring signal, which may be caused by the measuring circuit 12 having a malfunction due to the disturbance of the power supply can thereby be bridged.

In one embodiment of the invention, the integrated circuit 10 is reset after each disturbance. During this time, the measuring circuit 12 does not provide the desired measuring signal, rather the measuring signal takes a defined, but undesired value, e.g. the maximum or minimum possible value, the measuring circuit is able to provide. In this case, the above-mentioned period of availability of the value, which was stored in the intermediate memory 16 before the disturbance, is at least so long that it includes the period of reset.

In this case too, the value stored before the disturbance will mostly append better to the measuring signal delivered after reset than a maximum or minimum value delivered by the measuring circuit during reset. Hence, all together an output signal with minimal leaps results, which importantly facilitates further processing in the subsequent circuits.

The integrated circuit 10 may be, for example, a hall-sensor, where the measuring circuit 12 comprises the original sensor circuit and transfers the measuring values from the sensor into the measuring signal on the line 14. The invention ensures that the sensor provides a defined measuring value, i.e. the one assessed just before the disturbance, for a determined period of time. Hence, the sensor provides a measuring signal with minimal steps.

The invention is applicable to sensors with analog or digital signal processing, regardless which segments of the signal path are analog and which are digital.

Although the present invention has been illustrated and described with respect to several preferred embodiments thereof, various changes, omissions and additions to the form and detail thereof, may be made therein, without departing from the spirit and scope of the invention.

What is claimed is:

1. An integrated electronic circuit that receives a supply voltage $V_{DD}$, comprising:
    a measurement circuit that provides a measured signal; and
    an intermediate memory for storing the measured signal, wherein, upon a disturbance in the supply voltage $V_{DD}$ the intermediate memory retains the latest measured signal for a predetermined period, and wherein the intermediate memory is decoupled from the supply voltage $V_{DD}$,
    wherein the intermediate memory stores the measured signal value until it is ensured that valid values of the measured signal value are again read-in to the intermediate memory.

2. The integrated electronic circuit of claim 1, further comprising an output circuit for delivering an output signal in response to the measured signal, wherein the intermediate memory provides the intermediately stored measured signal to the output circuit.

3. The integrated electronic circuit of claim 1, wherein the intermediate memory is buffered.

4. The integrated electronic circuit of claim 1, where the measurement circuit comprises a Hall effect sensor.

5. The integrated electronic circuit of claim 1, wherein the measurement circuit is a distance or an angular sensor.

* * * * *